United States Patent
Yamaoka et al.

(10) Patent No.: US 11,987,239 B2
(45) Date of Patent: May 21, 2024

(54) DRIVING ASSISTANCE DEVICE

(71) Applicant: TOYOTA JIDOSHA KABUSHIKI KAISHA, Toyota (JP)

(72) Inventors: Masaaki Yamaoka, Tokyo-to (JP); Florin Baiduc, Chiba (JP); Yuki Yoshihama, Tokyo-to (JP); Yuki Hayakawa, Tokyo-to (JP); Masayasu Tanase, Ichikawa (JP); Gang Zhang, Saitama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 17/010,305

(22) Filed: Sep. 2, 2020

(65) Prior Publication Data

US 2021/0070288 A1 Mar. 11, 2021

(30) Foreign Application Priority Data

Sep. 5, 2019 (JP) ................. 2019-161985

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *B60W 30/18163* (2013.01);
(Continued)

(58) Field of Classification Search
None
See application file for complete search history.

(56) References Cited

U.S. PATENT DOCUMENTS

2009/0303078 A1* 12/2009 Mochizuki ............. G08G 1/166
340/901
2014/0136015 A1 5/2014 Hayakawa et al.
(Continued)

FOREIGN PATENT DOCUMENTS

CN 103635947 A 3/2014
CN 105009175 A 10/2015
(Continued)

OTHER PUBLICATIONS

Machine translation of JP-2000-011300 (Year: 2022).*

*Primary Examiner* — Aniss Chad
*Assistant Examiner* — Jennifer M Anda
(74) *Attorney, Agent, or Firm* — Sughrue Mion, PLLC

(57) ABSTRACT

A driving assistance device includes a visibility determination unit that determines whether visual recognition within a predetermined distance from a vehicle can be achieved in a traveling direction of the vehicle, an operation detection unit that detects an operation of causing the vehicle to enter a space in which an oncoming vehicle travels, based on information representing an operation of the vehicle by a driver, and a control warning unit that warns the driver or controls the vehicle in such a way that the vehicle does not enter the space when the visibility determination unit determines that visual recognition within the predetermined distance cannot be achieved, and the operation detection unit detects the operation of causing the vehicle to enter the space.

7 Claims, 4 Drawing Sheets

(51) Int. Cl.
*B60W 30/18* (2012.01)
*B60W 40/072* (2012.01)
*B60W 50/14* (2020.01)
*G06V 20/58* (2022.01)

(52) U.S. Cl.
CPC .......... *B60W 40/072* (2013.01); *B60W 50/14* (2013.01); *G06V 20/58* (2022.01); *B60W 2050/143* (2013.01); *B60W 2554/802* (2020.02); *B60W 2556/40* (2020.02)

(56) References Cited

U.S. PATENT DOCUMENTS

| | | | |
|---|---|---|---|
| 2014/0149013 A1* | 5/2014 | Matsuno | B60R 21/00 701/70 |
| 2014/0214255 A1 | 7/2014 | Dolgov et al. | |
| 2015/0360721 A1 | 12/2015 | Matsuno et al. | |
| 2019/0054922 A1* | 2/2019 | Yalla | B60W 10/18 |
| 2019/0073903 A1 | 3/2019 | Baba et al. | |
| 2019/0248347 A1* | 8/2019 | Kim | B60W 30/0956 |
| 2020/0353863 A1* | 11/2020 | Weksler | B60W 50/14 |
| 2021/0163009 A1* | 6/2021 | Spika | B60W 40/072 |
| 2022/0171590 A1* | 6/2022 | Seitz | B60K 35/00 |

FOREIGN PATENT DOCUMENTS

| | | |
|---|---|---|
| JP | 07-003099 U | 1/1995 |
| JP | 2000-11300 A | 1/2000 |
| JP | 2016-002892 A | 1/2016 |
| JP | 2019-036050 A | 3/2019 |
| JP | 2019-46413 A | 3/2019 |
| WO | 2013/031095 A1 | 3/2013 |

\* cited by examiner

DRIVING ASSISTANCE DEVICE

FIELD OF THE INVENTION

The present invention relates to a driving assistance device that assists in driving of a driver.

BACKGROUND OF THE INVENTION

In Japanese Unexamined Patent Application Publication No. 2016-2892, for example, notification to a driver or an automatic change of a lane to an original lane has been proposed when it is preferable not to perform passing traveling itself and when it is preferable to return to an original lane without passing a preceding vehicle in a case in which passing control is performed by using a technique of automatic driving.

SUMMARY OF THE INVENTION

When passing of a preceding vehicle is performed, visibility in front of a vehicle may be poor due to a curve located ahead on a road, for example. Alternatively, visibility in front may be poor due to weather condition such as fog, rainfall, and snowfall. When a vehicle enters an opposite lane in such a state where a driver cannot visually recognize a situation in front, an oncoming vehicle unexpectedly approaches in front, and there is a possibility that the vehicle that enters the opposite lane may collide with the oncoming vehicle.

However, visibility in front of a vehicle is not taken into consideration at all in the technique described in Japanese Unexamined Patent Application Publication No. 2016-2892, and thus another vehicle may not be detected depending on a situation around the vehicle. As a result, there is a possibility that the vehicle may collide with another vehicle that is not detected when the vehicle passes a preceding vehicle.

Thus, an object of the present invention is to provide a driving assistance device capable of reducing a risk of colliding with an oncoming vehicle.

The present invention was made so as to solve the above problem and has as its gist the following.

(1) A driving assistance device, comprising:
a processor configured to:
determine whether visual recognition within a predetermined distance can be achieved from a vehicle in a traveling direction of the vehicle;
detect an operation of causing the vehicle to enter a space in which an oncoming vehicle travels, based on information representing an operation of the vehicle by a driver; and
warn the driver or control the vehicle in such a way that the vehicle does not enter the space when the visibility determination unit determines that visual recognition within the predetermined distance cannot be achieved, and the operation detection unit detects an operation of causing the vehicle to enter the space.

(2) The driving assistance device according to above (1), wherein the processor determines whether visual recognition within the predetermined distance from the vehicle can be achieved, based on positional information about an obstruction being an obstacle when visually recognizing ahead that is acquired from an image in which a front of the vehicle is imaged or information related to visibility on a road in front of the vehicle that is acquired from map information about surroundings of the vehicle and a position of the vehicle.

(3) The driving assistance device according to above (1), wherein the processor determines a position of an opposite lane, and detects the operation of causing the vehicle to enter the space when a lane as a change destination is the opposite lane in a case in which an operation of the vehicle by the driver is a lane change operation.

(4)) The driving assistance device according to above (1), wherein the processor detects the operation of causing the vehicle to enter the space, based on a curvature of a road on which the vehicle travels that is acquired from an image in which a front of the vehicle is imaged or map information about surroundings of the vehicle, and a steering amount of the driver.

(5) The driving assistance device according to above (1), wherein the processor detects the operation of causing the vehicle to enter the space, based on map information about surroundings of the vehicle and an operation of a direction indicator of the vehicle by the driver.

(6) The driving assistance device according to above (1), wherein
the predetermined distance is changed in response to a speed of the vehicle.

The driving assistance device according to the present invention achieves an effect capable of reducing a risk of colliding with an oncoming vehicle.

DESCRIPTION OF EMBODIMENTS

A driving assistance system will be described below with reference to the drawings. The driving assistance system recognizes a situation around a vehicle when a driver causes the vehicle to enter a space in which an oncoming vehicle travels in a case in which the driver who drives the vehicle by manual driving tries to pass a preceding vehicle traveling in front and the like, for example, and assists in driving of the driver in such a way as not to collide with the oncoming vehicle.

When a driver passes a preceding vehicle, the driver operates the vehicle in such a way as to enter the vehicle in an opposite lane from a current lane, to pass the preceding vehicle, and then to return the vehicle to the original lane. At this time, in a case in which an oncoming vehicle travels in the opposite lane from an opposite side, there is a possibility that the vehicle may collide with the oncoming vehicle when the vehicle enters the opposite lane. Particularly, when the vehicle enters the opposite lane while a situation in front of the vehicle cannot be visually recognized, the oncoming vehicle unexpectedly approaches in front, and there is a possibility that the vehicle may collide with the oncoming vehicle. Note that a space in which an oncoming vehicle travels is a space on a right side of a region in which a vehicle travels on a road of left-hand traffic. In the present embodiment, an opposite lane is one example of the space in which an oncoming vehicle travels.

Thus, in the present embodiment, in a case in which a driver drives a vehicle by manual driving, when the driver tries to pass a preceding vehicle traveling in front while the driver cannot visually recognize a situation in front, a driving assistance system 40 assists in driving in such a way as to prevent a collision with an oncoming vehicle before it happens.

The assistance to a driver is mainly performed by two methods. In a first method, the driving assistance system 40 gives a warning to a driver who tries to pass a preceding vehicle traveling in front while the driver cannot visually recognize a situation in front. Further, in a second method, the driving assistance system 40 controls a vehicle in such a way as to return to an original lane when a driver tries to pass a preceding vehicle traveling in front while the driver cannot visually recognize a situation in front.

The driving assistance system 40 can suppress a collision of a vehicle with an oncoming vehicle by performing such assistance when a driver tries to pass a preceding vehicle traveling in front while the driver cannot visually recognize a situation in front of the vehicle.

Figure 1:
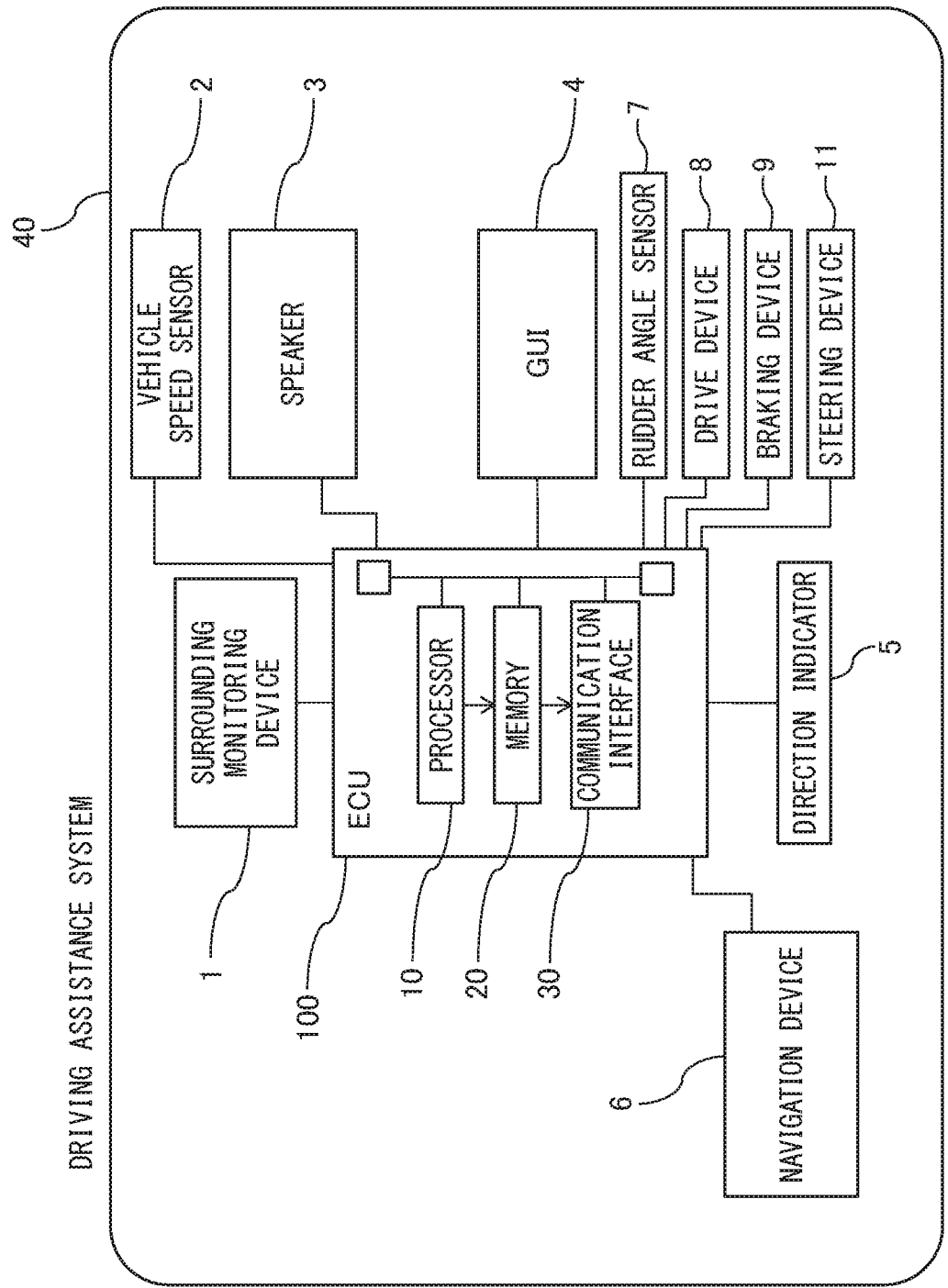
FIG. 1 is a schematic configuration diagram of a driving assistance device according to one embodiment.

FIG. 1 is a schematic configuration diagram of the driving assistance system 40 according to one embodiment. The driving assistance system 40 is installed in a vehicle 50. The driving assistance system 40 includes a surrounding monitoring device 1, a vehicle speed sensor 2, a speaker 3, a graphical user interface (GUI) 4, a direction indicator 5, a navigation device 6, a rudder angle sensor 7, a drive device 8, a braking device 9, a steering device 11, and a control unit (electronic control unit (ECU)) 100. Each of the surrounding monitoring device 1, the vehicle speed sensor 2, the speaker 3, the GUI 4, the direction indicator 5, the navigation device 6, the rudder angle sensor 7, the drive device 8, the braking device 9, the steering device 11, and the control unit 100 is communicably connected via an in-vehicle network conforming to a standard such as a controller area network (CAN).

The surrounding monitoring device 1 is a device for monitoring surroundings of the vehicle 50, particularly, the front of the vehicle 50, and is constituted of a sensor such as a camera, a light detection and ranging (lidar), or a radar, for example. The surrounding monitoring device 1 monitors surroundings of the vehicle 50, and particularly detects information related to a situation in front of the vehicle 50.

When the surrounding monitoring device 1 is a camera, the camera includes a two-dimensional detector configured with an array of photoelectric conversion elements having sensitivity to visible light, such as a CCD or a C-MOS, and an imaging optical system that forms an image of a region to be imaged on the two-dimensional detector. For example, the camera is installed in such a way as to face the front in a vehicle room of the vehicle 50, images a region outside the vehicle, particularly, a front region of the vehicle 50 at every predetermined imaging period (for example, $\frac{1}{30}$ seconds to $\frac{1}{10}$ seconds), and generates an image of the front region of the vehicle 50. Note that the image acquired by the camera is preferably a color image. Every time the camera generates an image, the camera outputs the generated image to the control unit 100 via the in-vehicle network.

The vehicle speed sensor 2 is a sensor that detects a speed of the vehicle 50. The speaker 3 is one example of a notification unit, is provided in the vicinity of a dashboard and the like, and outputs sound or voice in order to notify a driver of a warning. The GUI 4 is another example of a notification unit, is provided in a meter panel, in the vicinity of a dashboard, and the like, and outputs display in order to notify a driver of a warning. The GUI 4 is constituted of a liquid crystal display device (LCD) and the like, for example.

The direction indicator 5 is a device that is operated by a driver and transmits a path of the vehicle 50 to another vehicle. The navigation device 6 calculates a traveling route from a current position of the vehicle 50 to a movement destination according to a predetermined route search technique such as a Dijkstra method. Thus, the navigation device 6 includes a global positioning system (GPS). Further, the navigation device 6 includes a memory that stores map information. Note that the map information may be stored in a memory 20 of the control unit 100.

The rudder angle sensor 7 is a sensor that detects a steering angle when a driver operates steering. The drive device 8 is a device such as an internal combustion engine or a motor serving as a drive source that drives the vehicle 50. The braking device 9 is a braking device that brakes the vehicle 50. The steering device 11 is a device that turns the vehicle 50.

The control unit 100 is a component that controls the entire driving assistance system 40, and is one aspect of a driving assistance device. The control unit 100 includes a processor 10, the memory 20, and a communication interface 30. The processor 10 includes one or a plurality of central processing units (CPUs) and a peripheral circuit thereof. The processor 10 may further include another arithmetic circuit such as a logical arithmetic unit, a numerical arithmetic unit, or a graphic processing unit. The memory 20 is one example of a storage unit, and includes, for example, a volatile semiconductor memory and a non-volatile semiconductor memory. The communication interface 30 is one example of a communication unit, and includes an interface circuit for connecting the control unit 100 to the in-vehicle network.

The driving assistance system 40 configured as described above determines whether a situation in front of the vehicle 50 cannot be visually recognized, based on information related to the situation in front of the vehicle 50 being acquired from the surrounding monitoring device 1 or the navigation device 6. Then, in a case in which the driving assistance system 40 determines that a state is the state where the situation in front of the vehicle 50 cannot be visually recognized, the driving assistance system 40 performs driving assistance to a driver when the driver tries to pass a preceding vehicle.

Specifically, in a case in which the driving assistance system 40 determines that a state is the state where the situation in front of the vehicle 50 cannot be visually recognized, the driving assistance system 40 notifies the driver of a warning via the speaker 3 or the GUI 4 when the driver tries to pass a preceding vehicle.

The notification of the warning is performed by a sound or a voice output from the speaker 3 or display to the GUI 4. For example, the notification of the warning is performed by displaying, on a meter panel, a notification such as "Do not enter the opposite lane due to poor visibility in front!" and "Oncoming vehicle is approaching! Do not enter the opposite lane!". Further, the warning is performed by providing a similar notification by voice. The driver notified by the warning operates the vehicle 50 in such a way as not to enter an opposite lane from a lane in which the driver currently travels, and thus a collision of the vehicle 50 with an oncoming vehicle traveling in the opposite lane can be suppressed.

Further, in a case in which the driving assistance system 40 determines that a state is the state where the situation in front of the vehicle 50 cannot be visually recognized, the driving assistance system 40 controls the vehicle 50 in such a way that the vehicle 50 does not enter an opposite lane when the driver tries to pass a preceding vehicle. Further, when the vehicle 50 already enters an opposite lane, the driving assistance system 40 controls the vehicle 50 in such a way as to return to an original lane from the opposite lane. In this way, a collision of the vehicle 50 with an oncoming vehicle is suppressed.

Examples of the state where a situation in front of the vehicle 50 cannot be visually recognized include, for example, a state where there is a blind spot ahead of a curve in front, a state where there is a blind spot ahead of an ascent or a descent in front, a state where visibility in front is poor due to fog, rainfall, snowfall, or the like, and the like. Further, examples of the state where a situation in front of the vehicle 50 cannot be visually recognized also include a state where there is a blind spot ahead of a preceding vehicle, such as a case in which a preceding vehicle traveling in front is a large-sized vehicle, and the like.

Figure 2:
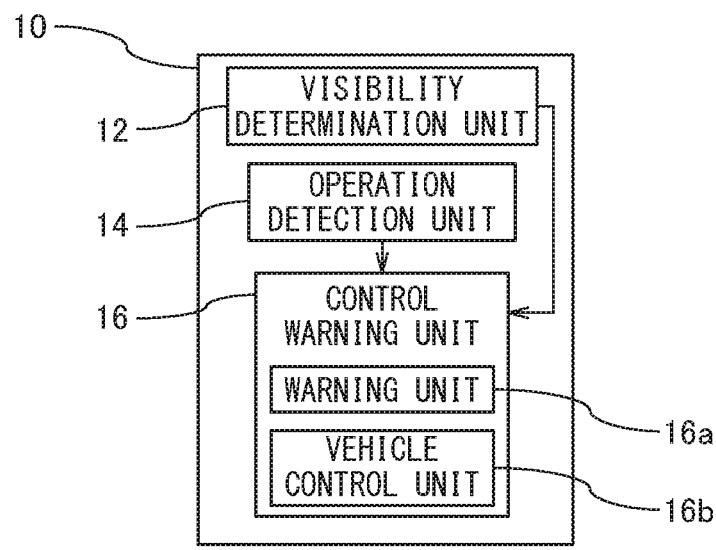
FIG. 2 is a schematic diagram illustrating a functional block of a processor of a control unit.

FIG. 2 is a schematic diagram illustrating a functional block of the processor 10 of the control unit 100. In order to perform the control as described above, the processor 10 of the control unit 100 includes a visibility determination unit 12, an operation detection unit 14, and a control warning unit 16. The control warning unit 16 includes a warning unit 16a and a vehicle control unit 16b.

Each of the units included in the processor 10 is, for example, a functional module achieved by a computer program operating on the processor 10. In other words, a functional block of the processor 10 is constituted of the processor 10 and a program (software) for causing to function the processor 10. Further, the program may be recorded in the memory 20 included in the control unit 100 or a recording medium connected from the outside. Alternatively, each of the units included in the processor 10 may be a dedicated arithmetic circuit provided in the processor 10.

Figure 3:
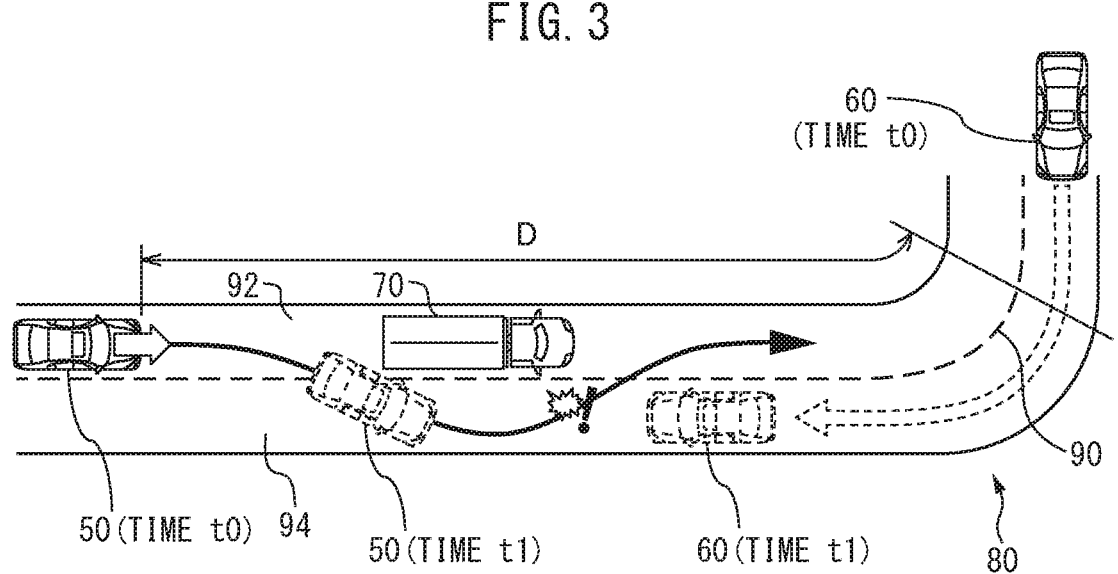
FIG. 3 is a schematic diagram illustrating driving assistance to a driver by a driving assistance system.
Figure 4:
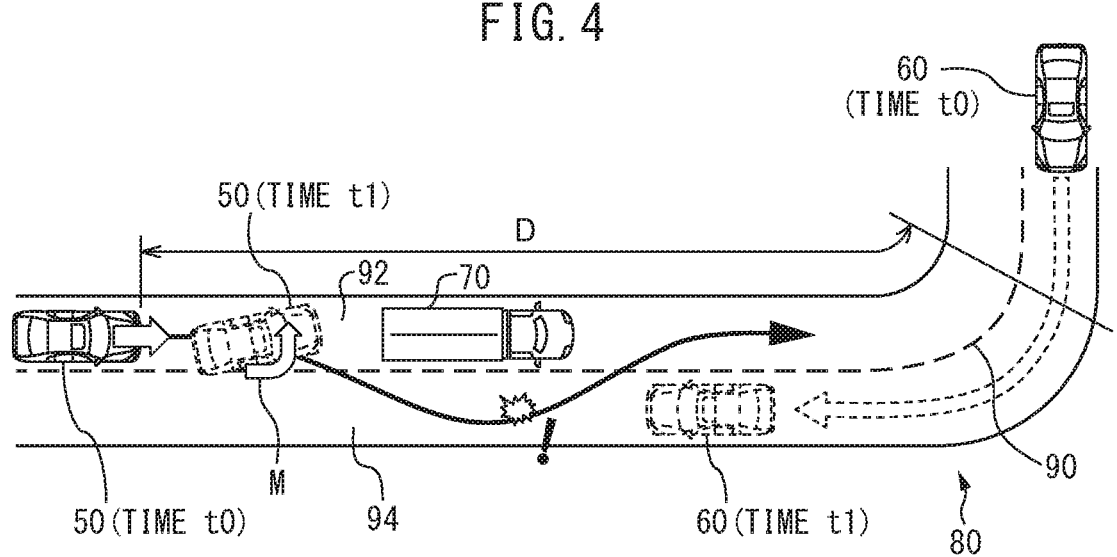
FIG. 4 is a schematic diagram illustrating driving assistance to a driver by the driving assistance system.

FIGS. 3 and 4 are schematic diagrams illustrating driving assistance to a driver by the driving assistance system 40. FIG. 3 illustrates a case in which the driving assistance system 40 gives a warning to the driver. FIG. 4 illustrates a case in which the driving assistance system 40 performs vehicle control.

FIGS. 3 and 4 illustrate a state where the vehicle 50 tries to pass a preceding vehicle 70 in a situation where the driver drives the vehicle 50 by manual driving in a lane 92 on a road having one lane on one side, and an oncoming vehicle 60 travels in an opposite lane 94. FIGS. 3 and 4 illustrate, for the vehicle 50 and the oncoming vehicle 60, a position at a point of time at a time t0 and a position at a point of time at a time t1 at which a predetermined period of time has elapsed since the time t. The driver of the vehicle 50 starts a vehicle operation for passing the preceding vehicle 70 at the time t0.

In FIGS. 3 and 4, the preceding vehicle 70 is a large-sized vehicle such as a truck, and the driver of the vehicle 50 is in a state where it is difficult for the driver to visually recognize a situation in front. Further, a curve 80 is present ahead of the preceding vehicle 70, and the oncoming vehicle 60 enters a blind spot of the curve 80 at the point of time (time t0) at which the vehicle 50 tries to pass the preceding vehicle 70, and thus the driver of the vehicle 50 is in a state where it is difficult for the driver to visually recognize the oncoming vehicle 60.

The visibility determination unit 12 of the control unit 100 determines whether visual recognition within a predetermined distance D from the vehicle 50 can be achieved in a traveling direction of the vehicle 50, based on information acquired from the surrounding monitoring device 1 or the navigation device 6.

When the camera of the surrounding monitoring device 1 is used, the visibility determination unit 12 determines presence or absence of an obstruction (such as an object and a curve) when the visually recognizing ahead from an image acquired by the camera, and determines that visual recognition within the distance D can be achieved when there is no obstruction within the predetermined distance D. For example, the visibility determination unit 12 detects an obstruction such as the preceding vehicle 70 in front, the oncoming vehicle 60 in front, and the curve 80 in front by inputting image information for each frame of the front of the vehicle 50 being acquired from the camera of the surrounding monitoring device 1 to a classifier that has been previously learned for object detection, and determines whether visual recognition within the predetermined distance D from the vehicle 50 can be achieved. A distance to an obstruction is detected from a sensor such as the lidar, the radar, and the like of the surrounding monitoring device 1. Further, when a stereo camera is used, a distance to an obstruction is detected based on parallax between left and right images. Even when an obstruction is present, the visibility determination unit 12 determines that visual recognition within the distance D can be achieved in a case in which the obstruction is present ahead of the distance D.

Further, for example, as described in Japanese Unexamined Patent Application Publication No. 2016-2892 mentioned above, by performing known grouping processing on distance information, for example, based on a position of an obstruction acquired from image information generated by the camera of the surrounding monitoring device 1, and comparing the distance information subjected to the grouping processing with three-dimensional road shape data and three-dimensional object data that are previously set, the visibility determination unit 12 may extract lane division line data, side wall data such as a guardrail and a curb present along a road, three-dimensional object data such as a parked vehicle, and the like together with a relative position (distance and angle) from the vehicle 50 and a speed.

As described above, the visibility determination unit 12 determines whether visual recognition to the predetermined distance D from the vehicle 50 can be achieved as illustrated in FIGS. 3 and 4. In the examples illustrated in FIGS. 3 and 4, a large-sized truck travels as the preceding vehicle 70 in front of the vehicle 50. Therefore, it is relatively difficult to visually recognize the front of the vehicle 50 in a region blocked by the preceding vehicle 70 even within the distance D. Further, since there is the curve 80 before a point at the distance D from the vehicle 50, the oncoming vehicle 60 ahead of the curve 80 cannot be recognized from the vehicle 50 at the point of time at the time t0. Thus, in the examples in FIGS. 3 and 4, the visibility determination unit 12 determines that visual recognition within the predetermined distance D from the vehicle 50 cannot be achieved.

Note that the distance D may be changed in response to a speed of the vehicle 50. When visual recognition to the distance D cannot be achieved, warning to a driver and control of a vehicle can be basically performed at an earlier stage by setting a longer distance D in which whether visual recognition can be achieved is determined as a speed of a vehicle is faster, and thus a collision with an oncoming vehicle is reliably avoided. Further, when the oncoming vehicle 60 travels, a speed thereof can be predicted from a speed limit of a road, and thus a time until a collision with the oncoming vehicle 60 can be predicted when the vehicle 50 travels in the opposite lane 94. Further, a time required for passing can be predicted based on a relative speed between the vehicle 50 and the preceding vehicle 70. Therefore, a value of the distance D may be changed based on a predicted time until a collision with the oncoming vehicle 60 or a required time for passing that is determined in response to a speed of the vehicle 50. Note that a farther distance needs to be visually recognized and a situation in front needs to be recognized with a longer predicted time until a collision with the oncoming vehicle 60 or a longer required time for passing, and thus the distance D is set to be longer.

Further, the visibility determination unit 12 may acquire, from the navigation device 6, a shape of a road on which the vehicle 50 currently travels, a shape of a road on which the vehicle 50 will travel, a curvature of a curve, and the like, and determine whether visual recognition within a predetermined distance from the vehicle 50 can be achieved, based on these. In this case, a current position of the vehicle 50 and map information about surroundings of the current position of the vehicle 50 are acquired from the navigation device 6, and whether the curve 80 is present in front of the vehicle 50 is determined by applying the current position of the vehicle 50 to the map information. Then, the visibility determination unit 12 can determine whether visual recognition within the predetermined distance D from the vehicle 50 can be achieved, based on a positional relationship between the current position of the vehicle 50 and the curve 80.

Figure 6:
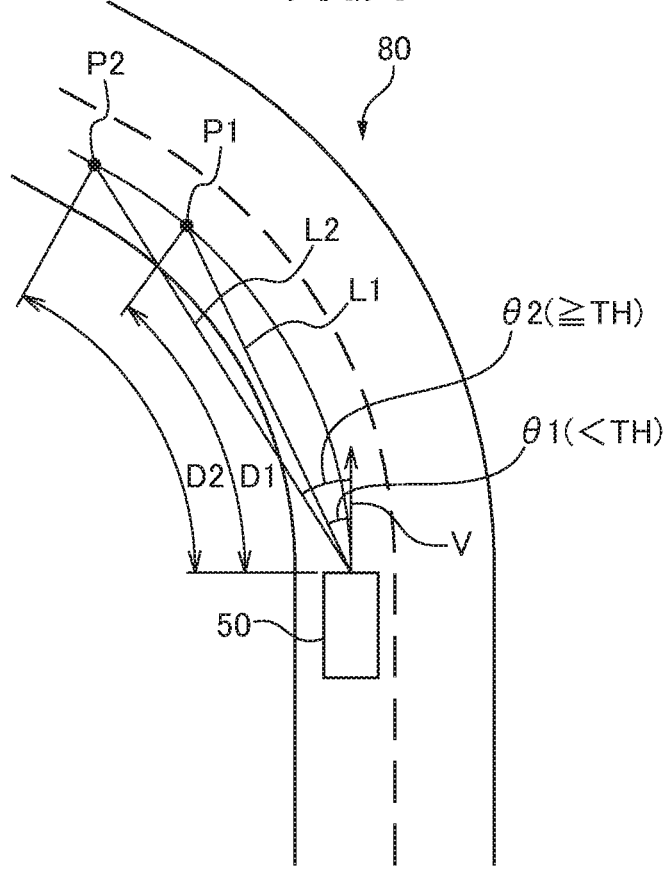
FIG. 6 is a schematic diagram illustrating a method for determining whether visual recognition to a predetermined distance D from a vehicle can be achieved when map information is used.

FIG. 6 is a schematic diagram illustrating a method for determining whether visual recognition to the predetermined distance D from the vehicle 50 can be achieved when the map information is used. The visibility determination unit 12 determines whether visual recognition within the predetermined distance D from the vehicle 50 can be achieved, based on information related to visibility on a road in front of the vehicle 50 that is acquired from the map information and a position of the vehicle 50. Specifically, the visibility determination unit 12 determines that visual recognition to the distance D from the vehicle 50 can be achieved when an angle θ formed by a straight line L connecting a position ahead of the vehicle 50 at the distance D on the road to the vehicle 50 and a traveling direction vector V of the vehicle 50 is less than a predetermined threshold value. In the example illustrated in FIG. 6, an angle θ1 formed by a straight line L connecting a position P1 ahead of the vehicle 50 at a distance D1 on the road to the vehicle 50 and the traveling direction vector V of the vehicle 50 is less than a predetermined threshold value TH. Therefore, the visibility determination unit 12 determines that visual recognition to the distance D1 from the vehicle 50 can be achieved. On the other hand, an angle θ2 formed by a straight line L2 connecting a position P2 ahead of the vehicle 50 at a distance D2 on the road to the vehicle 50 and the traveling direction vector V of the vehicle 50 is greater than or equal to the predetermined threshold value TH. Therefore, the visibility determination unit 12 determines that visual recognition to the distance D2 from the vehicle 50 cannot be achieved. As described above, whether visual recognition within the predetermined distance D from the vehicle 50 can also be determined by applying a current position of the vehicle 50 to the map information. Note that the straight line L is defined in such a way as to connect both ends of the distance D in FIG. 6, but the straight line L may be defined in such a way as to connect a starting point and an end point of a track predicted when the vehicle 50 travels during a predetermined period of time from the state in FIG. 6, such as a case in which the straight line L is defined in such a way as to connect a position of the vehicle 50 after two seconds and a position thereof after five seconds, for example.

Further, when determination is performed by the method illustrated in FIG. 6, it may be determined that visual recognition to the distance D can be achieved even though visual recognition to the distance D cannot be originally achieved in a case of traveling on an S-shaped curve and the like. Thus, the visibility determination unit 12 may perform similar processing, based on three or more different future predicted positions of the vehicle 50, calculate a plurality of angles θ, and use a total, an average value, or the like of absolute values of θ for determination. In this case, the visibility determination unit 12 determines that visual recognition to the distance D from the vehicle 50 cannot be achieved when the total, the average value, or the like of the absolute values of θ is greater than or equal to a predetermined value. In this way, occurrence of false determination is suppressed in a case of traveling on an S-shaped curve and the like.

Figure 7:
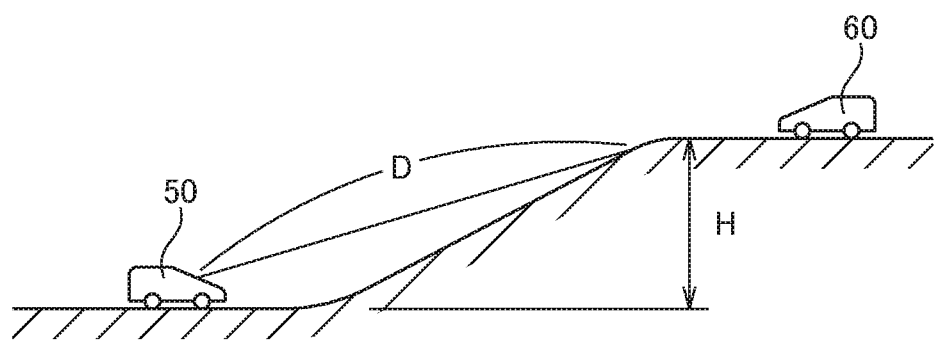
FIG. 7 is a schematic diagram illustrating a method for detecting an up-and-down amount H, based on a difference between an altitude of a current position acquired from a GPS of a navigation device and an altitude in a traveling direction included in the map information, and determining whether visual recognition to the predetermined distance D can be achieved with a degree of the up-and-down amount H.

Further, FIG. 7 is a schematic diagram illustrating a method for detecting an up-and-down amount H, based on a difference between an altitude of a current position acquired from a GPS of the navigation device 6 and an altitude in a traveling direction included in the map information, and determining whether visual recognition to the predetermined distance D can be achieved with a degree of the up-and-down amount H. As illustrated in FIG. 7, when the up-and-down amount H exceeds a predetermined value, visual recognition to the predetermined distance D from the vehicle 50 cannot be achieved, and the oncoming vehicle 60 cannot be visually recognized from the vehicle 50. Therefore, the visibility determination unit 12 can determine whether visual recognition to the predetermined distance D can be achieved, based on the up-and-down amount H. Note that a value of the up-and-down amount H by which visual recognition to the predetermined distance D from the vehicle 50 cannot be achieved can be calculated from a geometric relationship illustrated in FIG. 7.

Further, the visibility determination unit 12 determines whether visual recognition within the predetermined distance D from the vehicle 50 can be achieved in the traveling direction of the vehicle 50, based on a detection result of fog, rain, or snow. Note that the visibility determination unit 12 may apply, for detection of fog, a technique for determining fog by using a brightness distribution of a visibility image acquired by receiving near infrared light, which is described in Japanese Unexamined Patent Application Publication No. 2013-235444, for example. In this case, the surrounding monitoring device 1 includes an infrared camera mainly configured of a CMOS sensor and the like having sensitivity to near infrared light, and thus the visibility determination unit 12 acquires a visibility image acquired by receiving near infrared light by the infrared camera. Then, the visibility determination unit 12 previously requires a relationship between a brightness distribution of the visibility image acquired by receiving near infrared light and the distance D in which visual recognition can be achieved, and thus determines whether visual recognition within the predetermined distance D from the vehicle 50 can be achieved, based on the brightness distribution. When a detection result of rain or snow is used, the visibility determination unit 12 previously requires a relationship between an amount of rainfall or an amount of snowfall and the distance D in which visual recognition can be achieved, and thus determines whether visual recognition within the predetermined distance D from the vehicle 50 can be achieved, based on the amount of rainfall or the amount of snowfall. Note that the visibility determination unit 12 may acquire the amount of rainfall or the amount of snowfall from a rainfall amount detection sensor and the like provided in the vehicle 50. Further, when the driving assistance system 40 includes a communication module that communicates with an external server and the like, the visibility determination unit 12 may acquire the amount of rainfall or the amount of snowfall acquired by communicating with the external server and the like by the communication module.

The operation detection unit 14 of the control unit 100 detects an operation of causing the vehicle 50 to enter a space in which an oncoming vehicle travels, based on information representing an operation of the vehicle 50 by the driver. The operation detection unit 14 detects the operation of causing the vehicle 50 to enter the space in which the oncoming vehicle travels, based on a signal acquired from the surrounding monitoring device 1, the vehicle speed sensor 2, the direction indicator 5, the rudder angle sensor 7, and the like.

For example, the operation detection unit 14 acquires operation information about the direction indicator 5 by the driver, and detects the operation of causing the vehicle 50 to enter the space in which the oncoming vehicle travels, based on the operation information about the direction indicator 5. In the examples in FIGS. 3 and 4, when the driver of the vehicle 50 operates the direction indicator 5 to the right even though an intersection is not present, the operation detection unit 14 detects the operation of causing the vehicle 50 to enter the space in which the oncoming vehicle travels. Note that absence of an intersection can be acquired from the map information included in the navigation device 6.

Further, the operation detection unit 14 may detect the operation of causing the vehicle 50 to enter the space in which the oncoming vehicle travels, based on a positional change of the vehicle 50, a change in yaw angle, and the like. Specifically, the operation detection unit 14 may detect the operation of causing the vehicle 50 to enter the space in which the oncoming vehicle travels, based on a steering angle of steering acquired from the rudder angle sensor 7. For example, the operation detection unit 14 acquires a curvature of a road on which the vehicle 50 currently travels from the navigation device 6, and detects the operation of causing the vehicle 50 to enter the space in which the oncoming vehicle travels when steering is operated in a right direction at a steering angle deviating from a steering angle determined in response to the curvature and a vehicle speed by greater than or equal to a predetermined value.

Further, the operation detection unit 14 may detect positional information about the lane division line 90 and a curvature of the lane division line 90 from image information generated by the camera of the surrounding monitoring device 1, and detect the operation of causing the vehicle 50 to enter the space in which the oncoming vehicle travels. Thus, the operation detection unit 14 detects the position and the curvature of the lane division line 90 by inputting the image information for each frame of the front of the vehicle 50 to a classifier that has been previously learned for detection of the lane division line 90. Then, by calculating, in the latest certain period, a curvature of a track in which the vehicle 50 travels, based on a speed of the vehicle 50 acquired from the vehicle speed sensor 2 and a steering angle acquired from the rudder angle sensor 7, and comparing the calculated curvature with the curvature of the lane division line 90 detected from image information generated by the surrounding monitoring device 1, the operation detection unit 14 detects whether the vehicle 50 approaches the lane division line 90 or whether the vehicle 50 crosses the lane division line 90. When the operation detection unit 14 detects that the vehicle 50 approaches the lane division line 90 or the vehicle 50 crosses the lane division line 90, the operation detection unit 14 detects the operation of causing the vehicle 50 to enter the space in which the oncoming vehicle 60 travels.

FIGS. 3 and 4 illustrate the road having one lane on one side, but a lane as a change destination may not be an opposite lane when a lane is changed from a traveling lane to a passing lane and the like, such as a case in which a vehicle travels on a road having two lanes on one side and the like. Thus, when the vehicle 50 travels on a road having two or more lanes on one side, the operation detection unit 14 determines whether a lane as a change destination is an opposite lane, and detects the operation of causing the vehicle 50 to enter the space in which the oncoming vehicle 60 travels when the lane as the change destination is the opposite lane. In other words, even when the operation detection unit 14 detects the lane change operation, the operation detection unit 14 does not detect the operation of causing the vehicle 50 to enter the space in which the oncoming vehicle 60 travels when a lane being a change destination is not an opposite lane and is a lane in the same traveling direction as that of the vehicle 50, such as a passing lane.

Examples of a method for determining whether a lane as a change destination is an opposite lane include a method based on detection of the oncoming vehicle 60, a method based on detection of a traffic sign in an opposite direction, and the like. In the method based on detection of an oncoming vehicle, based on an image for each frame generated by the camera of the surrounding monitoring device 1, a vehicle is detected on the image. Then, the vehicle is tracked by applying predetermined tracking processing to the vehicle detected for each frame of the image, and the vehicle is recognized as the oncoming vehicle 60 when the vehicle approaches the vehicle 50. Further, processing of recognizing a lane is performed simultaneously with the processing of recognizing the oncoming vehicle 60. In the processing of recognizing a lane, a region between the two adjacent lane division lines 90 detected based on an image for each frame generated by the camera of the surrounding monitoring device 1 is recognized as a lane. As described above, the operation detection unit 14 simultaneously performs recognition of the oncoming vehicle 60 and recognition of a lane, compares a position of the recognized oncoming vehicle 60 with a position of the recognized lane, and determines a lane related to the position of the recognized oncoming vehicle 60 as an opposite lane.

Further, in the method based on detection of the oncoming vehicle 60, when a portion corresponding to a headlight of a vehicle is detected by template matching in an image generated by the camera of the surrounding monitoring device 1, based on the image, the vehicle in the image faces forward, and thus the vehicle is recognized as the oncoming vehicle 60. Furthermore, the recognized oncoming vehicle 60 is compared with a lane recognized by other processing, and a lane in which the recognized oncoming vehicle 60 travels is determined as an opposite lane.

Note that, in the technique for determining whether a lane is an opposite lane, based on detection of an oncoming vehicle, the operation detection unit 14 always performs, at a certain period, determination of which lane is an opposite lane with respect to a lane in which the vehicle 50 currently travels. In this way, at a point of time at which the driver performs an operation of passing a preceding vehicle, a positional relationship between the lane in which the vehicle 50 travels and the opposite lane is clear, and thus the operation of causing the vehicle 50 to enter the space in which the oncoming vehicle travels can be detected.

Further, when a high-accuracy map including lane information can be used by the navigation device 6, which lane is an opposite lane with respect to a lane in which the vehicle 50 currently travels is determined based on a position of the vehicle 50 on the high-accuracy map. Therefore, the operation detection unit 14 can detect the operation of causing the vehicle 50 to enter a space in which an oncoming vehicle travels, based on the position of the vehicle 50 on the high-accuracy map.

Further, when the method based on detection of a traffic sign in an opposite direction is used as the method for determining whether a lane as a change destination is an opposite lane, characters such as "Stop" and "50" indicating a speed limit on a road, for example, are detected by the camera of the surrounding monitoring device 1. Then, the template matching is performed on the characters and a template image, and, when the characters are in the opposite direction, a lane in which the characters in the opposite direction are drawn is determined as an opposite lane.

When the visibility determination unit 12 determines that visual recognition within the predetermined distance D from the vehicle 50 cannot be achieved in the traveling direction of the vehicle 50, and the operation detection unit 14 detects the operation of causing the vehicle 50 to enter the space in which the oncoming vehicle 60 travels, the control warning unit 16 warns the driver or controls the vehicle 50 in such a way that the vehicle 50 does not enter the space. Note that the control warning unit 16 may perform both warning to the driver and control of the vehicle 50, or may perform only one of them.

In the example illustrated in FIG. 3, it is determined that visual recognition within the predetermined distance D from the vehicle 50 cannot be achieved. Thus, when the operation of causing the vehicle 50 to enter the space in which the oncoming vehicle 60 travels is detected, the warning unit 16a of the control warning unit 16 warns the driver via the notification unit (speaker 3. GUI 4) in such a way that the vehicle 50 does not enter the space.

Further, in the example illustrated in FIG. 4, it is determined that visual recognition within the predetermined distance D from the vehicle 50 cannot be achieved. Thus, when the operation of causing the vehicle 50 to enter the space in which the oncoming vehicle 60 travels is detected, the vehicle control unit 16b of the control warning unit 16 controls the drive device 8, the braking device 9, and the steering device 11 in such a way that the vehicle 50 does not enter the space.

More specifically, as illustrated in FIG. 4, when the driver starts the vehicle operation of passing the preceding vehicle 70 at the time t0, the operation detection unit 14 detects the operation of causing the vehicle 50 to enter the space in which the oncoming vehicle 60 travels. When the operation of causing the vehicle 50 to enter the space in which the oncoming vehicle 60 travels is detected, the vehicle control unit 16b of the control warning unit 16 controls the steering device 11 in such a way that the vehicle 50 turns to the left after the time t0, and steers front wheels of the vehicle 50 to the left. In this way, a turning moment M is generated in the vehicle 50 and the vehicle 50 turns, and thus the vehicle 50 remains in the original lane 92. Further, the control warning unit 16 controls the braking device 9 as necessary, and performs braking in such a way that the vehicle 50 does not collide with the preceding vehicle 70.

At this time, the vehicle control unit 16b of the control warning unit 16 may perform control in such a way as to return the vehicle 50 to the original lane 92, based on a positional change of the vehicle 50, a change in yaw angle, and the like. Specifically, in FIG. 4, the vehicle control unit 16b may perform control in such a way as to return the vehicle 50 to the original lane 92, based on a steering angle of steering acquired from the rudder angle sensor 7. For example, the vehicle control unit 16b performs control in such a way as to return the vehicle 50 to the original lane 92 by acquiring a curvature of a road on which the vehicle 50 currently travels from the navigation device 6, and controlling steering into the left direction further than a steering angle determined in response to the acquired curvature and a vehicle speed.

Further, the vehicle control unit 16b may perform control in such a way as to return the vehicle 50 to the original lane 92, based on positional information about the lane division line 90 and a curvature of the lane division line 90 that are detected by the surrounding monitoring device 1. In this case, the vehicle control unit 16b calculates a curvature of a track in which the vehicle 50 travels, based on a speed of the vehicle 50 acquired from the vehicle speed sensor 2 and a steering angle acquired from the rudder angle sensor 7. Then, the vehicle control unit 16b performs control in such a way as to return the vehicle 50 to the original lane 92 by comparing the curvature of the track in which the vehicle 50 travels with the curvature of the lane division line 90 detected by the surrounding monitoring device 1, and controlling steering in such a way that the vehicle 50 does not protrude from the lane division line 90.

Further, when there is no lane division line 90 on a road, the control warning unit 16 may perform control in such a way as to return the vehicle 50 to the original lane 92 by controlling steering in such a way that a distance to a road end on the left side falls within a predetermined value, based on a distance to the road end detected by the surrounding monitoring device 1 or a change over time in the distance.

Further, the control warning unit 16 may perform the operation of returning the vehicle 50 to the original lane 92 by setting a virtual lane division line at a predetermined proportion (for example, 50%) to a road width acquired from a road end, and controlling steering in such a way that the vehicle 50 does not protrude from the virtual lane division line.

Note that whether to perform the processing of the control warning unit 16 may be switched according to presence or absence of the preceding vehicle 70 and a speed of the vehicle 50. For example, when the preceding vehicle 70 is not present, the processing by the control warning unit 16 may not be performed.

Figure 5:
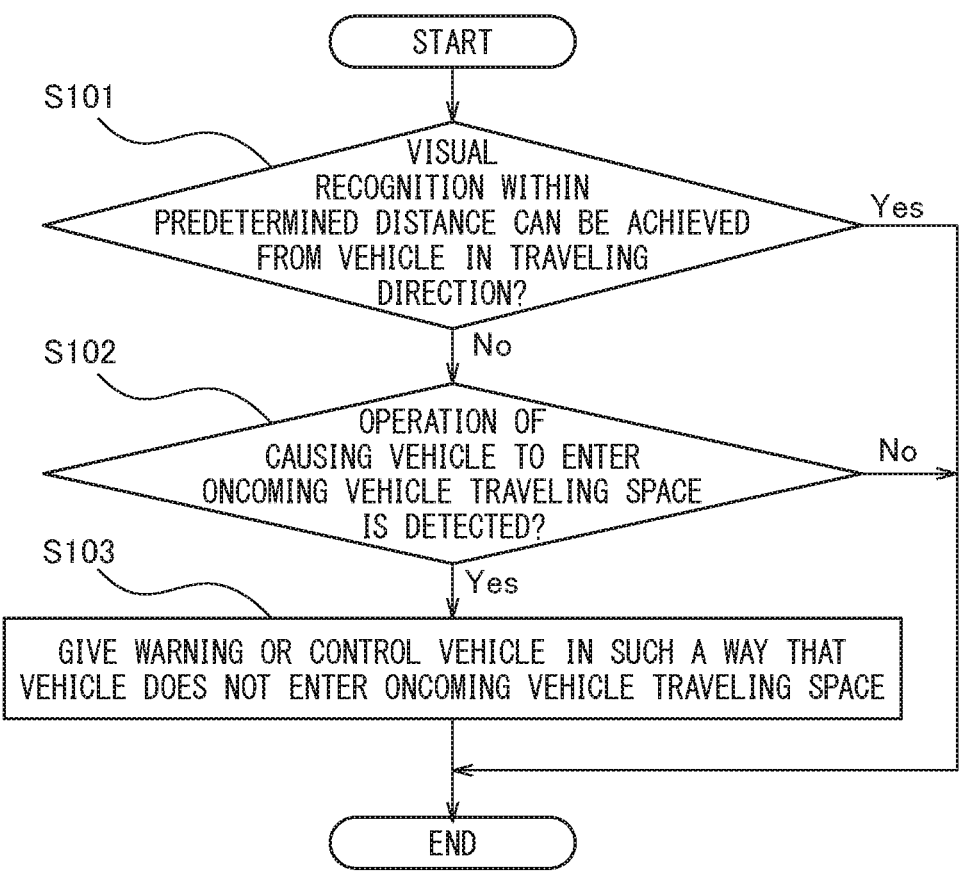
FIG. 5 is a flowchart illustrating processing in the present embodiment.

FIG. 5 is a flowchart illustrating processing in the present embodiment. The processing in FIG. 5 is performed at each predetermined control period by the control unit 100. First, the visibility determination unit 12 of the processor 10 determines whether visual recognition within a predetermined distance from the vehicle 50 can be achieved in a traveling direction (step S101). In step S101, when it is determined that visual recognition within the predetermined distance cannot be achieved, the processing proceeds to step S102. On the other hand, in step S101, when it is determined that visual recognition within the predetermined distance can be achieved, the processing is terminated.

In step S102, it is determined whether the operation detection unit 14 detects the operation of causing the vehicle 50 to enter a space in which an oncoming vehicle travels. Then, when the operation detection unit 14 detects the operation of causing the vehicle 50 to enter the space in which the oncoming vehicle travels, the processing proceeds to step S103. On the other hand, when the operation detection unit 14 does not detect the operation of causing the vehicle 50 to enter the space in which the oncoming vehicle travels, the processing is terminated.

In step S103, the control warning unit 16 gives a warning in such a way that the vehicle 50 does not enter the space in which the oncoming vehicle 60 travels, or controls the vehicle 50 in such a way that the vehicle 50 does not enter the space in which the oncoming vehicle 60 travels (step S103). After step S103, the processing is terminated.

Modification Example

In the above-described example, the opposite lane 94 is exemplified as an example of a space in which an oncoming vehicle travels, but the present embodiment can also be applied to a case in which the lane division line 90 is not present on a road and the lane 92 in which the vehicle 50 travels and the opposite lane 94 are not clearly divided such as a mountain path, for example. When the lane division line 90 is not present on a road, the operation detection unit 14 determines whether the vehicle 50 enters a space in which an oncoming vehicle travels, based on a distance to a road end acquired from image information generated by the camera of the surrounding monitoring device 1 or a change over time in the distance. For example, when a distance to a right end of the road becomes lower than a predetermined value or a distance to a left end of the road becomes greater than a predetermined value in a width direction of the road, the operation detection unit 14 detects the operation of causing the vehicle 50 to enter the space in which the oncoming vehicle travels. Note that the operation detection unit 14 determines a position of the right end or the left end of the road from a position of a guardrail, a curb, or the like acquired from the image information. Further, when a guardrail, a curb, or the like is not present on a mountain path and the like, the operation detection unit 14 determines a position of the right end or the left end of the road by performing image segmentation, based on an image generated by the camera of the surrounding monitoring device 1, and extracting a region of the road.

Further, when the lane division line 90 is not present on a road, the operation detection unit 14 sets a virtual lane division line at a predetermined proportion (for example, 50%) to a road width acquired from a road end, and detects the operation of causing the vehicle 50 to enter the space in which the oncoming vehicle 60 travels when the vehicle 50 crosses the virtual lane division line.

According to the present embodiment as described above, in a case in which the driver drives the vehicle 50 by manual driving, when the driver tries to pass a preceding vehicle traveling in front while the driver cannot visually recognize a situation in front, the driving assistance system 40 gives a warning to the driver. Further, in the case in which the driver drives the vehicle 50 by manual driving, when the driver tries to pass a preceding vehicle traveling in front while the driver cannot visually recognize a situation in front, the driving assistance system 40 controls the vehicle 50 in such a way as to return the vehicle 50 to an original lane. Therefore, a risk of colliding with an oncoming vehicle can be reduced.

The invention claimed is:

1. A driving assistance device, comprising a processor configured to:
    determine whether, due to poor visibility caused by at least one of fog, rain, and snow, an expected distance of visibility for a driver of a vehicle is below a predetermined distance from the vehicle in a traveling direction of the vehicle, based on a detection result of the at least one of fog, rain, and snow;
    while the vehicle is in an original lane, detect an entry operation that will cause the vehicle to enter an opposite lane, based on information representing driver operation of the vehicle; and
    control steering of the vehicle to return to or remain in the original lane, responsive to:
        a determination that the expected distance of visibility for the driver is below the predetermined distance, and
        the detection of the entry operation.

2. The driving assistance device according to claim 1, wherein the processor determines a position of the opposite lane, and detects the entry operation based on a lane change operation of the driver having the opposite lane as a destination.

3. The driving assistance device according to claim 1, wherein the processor detects the entry operation based on:
    a curvature of a road on which the vehicle travels, the curvature being acquired from an image in which a region in front of the vehicle is imaged, and
    a steering amount of the driver.

4. The driving assistance device according to claim 1, wherein the processor detects the entry operation based on:
    map information about surroundings of the vehicle, and
    an actuation of a direction indicator of the vehicle by the driver.

5. The driving assistance device according to claim 1, wherein the predetermined distance is changed in response to a speed of the vehicle.

6. The driving assistance device according to claim 1, wherein the processor detects the entry operation based on:
    map information about surroundings of the vehicle, and
    a steering amount of the driver.

7. A driving assistance device, comprising a processor configured to:
    determine whether, due to poor visibility caused by a visibility-impairing weather condition, an expected distance of visibility for a driver of a vehicle is below a predetermined distance from the vehicle in a traveling direction of the vehicle based on a detection result of the weather condition;
    while the vehicle is in an original lane, detect an entry operation that will cause the vehicle to enter an opposite lane, based on information representing driver operation of the vehicle; and control steering of the vehicle to return to or remain in the original lane, responsive to:
  a determination that the expected distance of visibility for the driver is below the predetermined distance, and
  the detection of the entry operation.

* * * * *